UNITED STATES PATENT OFFICE.

WALTER PROSSER HESKETT, OF CASTLECLIFF, NEW ZEALAND.

METAL COMPOUND POWDER AND PROCESS FOR THE PRODUCTION OF THE SAME.

1,421,471. Specification of Letters Patent. Patented July 4, 1922.

No Drawing. Application filed November 17, 1919. Serial No. 338,737.

*To all whom it may concern:*

Be it known that I, WALTER PROSSER HESKETT, subject of the King of Great Britain, residing at Castlecliff, Wanganui, in the Dominion of New Zealand, have invented a new and useful Metal Compound Powder and Process for the Production of the Same; and I do hereby declare the following to be a full, clear, and exact description of the same.

The object of this invention is to produce from metal compounds a fine powder of the whole metals, as distinct from the powders formed by the oxides, sulphides or chlorides of metals now produced for various commercial purposes, which wholly metallic powder forms a new article of manufacture that may be used for a large variety of purposes in the arts or sciences. This new product is capable by reason of its extreme fineness, of being combined by mechanical mixture with other ingredients to form paints, metal jointing for steam, ammonia and water systems, for admixture with cement or other binders to form blocks or tiles, or metal sheeting, or mouldable objects of all kinds, and acid resisting articles.

A further object of the invention is to provide a process whereby any suitable metals varying in nature with the desired characteristics of the powder to be produced, may be treated in order that they may be combined or alloyed together and the resultant combination or alloy be of a nature such that as it cools it will be self disintegrating and will crumble into the exceedingly fine and amorphous powder of the finished article.

For the purposes of carrying out the invention the several metals of the baser group, such as iron, manganese, copper, zinc, tin, lead, aluminum, antimony, silicon and bismuth are used and combined with one another either in whole or in part or in different relative proportions, to produce an alloy or compound. This alloying or compounding of the metals is effected by heat so applied as to obtain the complete fusion of the mass into one. This mass as it cools is self disintegrating, and when left for a short period, will resolve itself into an exceedingly fine powder without aid from any appliances.

The process by means of which the alloying or compounding of the metals is effected consists in the submission of the metals employed, within a melting furnace of any suitable design to heat so applied and controlled that the several metals are melted and alloyed without volatilization or oxidation of any of them. As such metals have necessarily different melting points, the heat of the furnace is so controlled that in the process of melting and alloying, each metal added to the compound will be added thereto while the previous mixture is in the fluid state and will be prevented thereafter from volatilizing or oxidizing by preventing any increase of heat above the temperature at which such metal is added to the furnace, or in the alternative by the use of coatings of carbon or the like applied to the surface of the mass and preventing the oxidation of the metals. For instance, the compound may be made by first treating the metals having the highest melting point and melting them together, and then as the temperature is lowered, adding progressively, the metals having the lower melting points while the previous mixture is still in the fluid state. In this manner the whole of the metals used may be alloyed together. The mass is then turned out and allowed to cool when it will disintegrate into the fine powder in the desired manner.

A suitable powder may be produced by the treatment of the following metals, used in the respective proportions mentioned, in the manner, hereinbefore set forth, viz:— Manganese 40%, iron 10%, copper 10%, aluminium 10%, tin 5%, zinc 15% and lead 10%. Instead of the lead, antimony may be employed, instead of the tin, bismuth, and silicon instead of the copper.

The above proportions are given as illustrating an admixture which will produce the metallic powder, but such proportions are not essential. Any suitable number of the metals may be used in the compound and the proportion of the metals employed may be varied within reasonable limits.

The process that has been carried out with most success consists in the use of the following metals, viz:—Antimony, aluminium, and ferromanganese. These are used in the proportions of, by weight, antimony 3 parts, aluminium 2½ parts, and ferromanganese and 18% iron. The process is carried out by first melting the ferromanganese in a covered crucible at about 3200° Fah. The aluminium is then added. This metal being cold when added reduces the crucible to a point where the heat is not high enough to boil or volatilize the alloy, or instead of the heat being reduced in this manner, the crucible may be lifted in the fire, if necessary. After the aluminium has been fully melted and combined with the ferromanganese, the process is repeated by the addition of the antimony to the mass. Immediately the antimony is melted the whole mass is stirred vigorously with a suitable rod so as to thoroughly mix the contents. The crucible is then lifted out of the furnace and the lid luted on with clay or other suitable substance and is placed on one side to thoroughly cool.

I claim:—

1. As a new article of manufacture, a metal compound powder produced by the self disintegration of metallic compounds or alloys.

2. As a new article of manufacture, a metal compound powder formed by the compounding or alloying of metals and the subsequent self disintegration of such compounds or alloys.

3. A metal compound powder produced by the melting and compounding or alloying together of different metals having different melting points by their subjection to heat at temperatures varying in correspondence with the respective melting points of the respective metals, such heat being so controlled and regulated as to prevent the volatilization and (or) oxidation of any of such metals during the treatment thereof.

4. A metal compound powder produced by the melting and compounding or alloying together of different metals having different melting points so as to form a mass self disintegrating upon the cooling thereof.

5. The method of producing a metal compound powder, consisting in melting a metal and while the same is in a molten condition successively adding thereto other metals having lower melting points and at the respective melting points of such metals, and turning out the mass to cause the same to cool and disintegrate.

6. The method of producing a metal compound powder, consisting in first melting a metal having a relatively high melting point and adding thereto other metals each having a lower melting point and as the respective melting points of such metals, preventing the mass from volatilizing or oxidizing, and turning out the mass to cause the same to cool and disintegrate.

7. In a method of producing a metal compound powder consisting of an alloy of metals having different melting points, the steps of first melting the metal having the highest melting point, lowering the temperature of the molten mass and progressively adding the other metals thereto as the respective melting points of such added metals.

8. The method of producing a metal compound powder consisting in melting different metals together, preventing volatilizing or oxidation thereof, and pouring out the mass to cause the same to cool and disintegrate.

In testimony whereof, I have signed this specification in the presence of two subscribing witnesses.

WALTER PROSSER HESKETT.

Witnesses:
MARJORIE TAVENDALE,
WALTER ALEXANDER.